United States Patent [19]

Quick et al.

[11] 4,296,994
[45] Oct. 27, 1981

[54] METHOD AND APPARATUS FOR HOLOGRAPHIC PROCESSING

[75] Inventors: William H. Quick, La Habra Heights; Kenneth A. James, Corona Del Mar; Virgil H. Strahan, Orange, all of Calif.

[73] Assignee: Rockwell International Corporation, El Segundo, Calif.

[21] Appl. No.: 5,619

[22] Filed: Jan. 22, 1979

[51] Int. Cl.³ ............................................. G02B 5/32
[52] U.S. Cl. ................................... 350/3.73; 350/320
[58] Field of Search .............................. 350/3.6–3.86, 350/320

[56] References Cited

U.S. PATENT DOCUMENTS

| | | | |
|---|---|---|---|
| 3,542,448 | 11/1970 | Reynolds | 350/3.73 X |
| 3,658,402 | 4/1972 | Nishida et al. | 350/3.86 X |
| 3,807,859 | 4/1974 | Sugaya et al. | 350/3.79 X |
| 3,831,035 | 8/1974 | Hill | 350/3.78 |
| 3,862,428 | 1/1975 | Waters | 350/3.73 |
| 3,911,410 | 10/1975 | Ohta et al. | 350/3.78 |
| 3,975,082 | 8/1976 | Winzer | 350/96.19 |
| 4,094,577 | 6/1978 | Spitz et al. | 350/162 ZP |

OTHER PUBLICATIONS

Levy, U. et al, "Optical Rearrangement of Light Information Transmitted Through Incoherent Fiber Bundles", (1978 Annual Meeting of Opt. Soc. Of Am.) vol. 68, No. 10, Nov., 1978, p. 1384.

*Primary Examiner*—John K. Corbin
*Assistant Examiner*—Bruce Y. Arnold
*Attorney, Agent, or Firm*—H. Fredrick Hamann; Morland C. Fischer

[57] ABSTRACT

A method and apparatus for holographically processing optical signals in a fiber-optic sensor system. In the present invention, holographic processors are utilized in various combinations with light sources, fiber-optic transmission means, sensors and detectors to provide low cost, compact, sensitive and accurate sensor systems.

By means of the holographic processors of the present invention, the aforementioned sensor systems are used to monitor such physical parameters as temperature, pressure, flow-rate, and the like, and to provide output signal indications thereof that are compatible with digital receiving stations and immune to electro-magnetic interference, hazardous atmosphere, and the inimical effects of inadvertent intensity variation due to equipment vibration and the like.

In one typical embodiment, a pair of holographic processors are employed in a color multiplex-demultiplex sensor system in which a first holographic processor is employed to color multiplex a sensor signal and a second holographic processor is employed to decode the color-multiplexed signal into a binary pattern that is then transmitted onto a set of photodetectors.

In each of the embodiments of the invention disclosed, a unique geometrical orientation of a hologram is utilized to minimize spurious signal interference that would otherwise hamper or totally preclude the holographic processing.

22 Claims, 17 Drawing Figures

METHOD AND APPARATUS FOR HOLOGRAPHIC PROCESSING

The invention described herein was made in the performance of work done under NASA Contract No. NAS3-21005 and is subject to the provisions of Section 305 of the National Aeronautics and Space Act of 1958 (72 Stat. 435; 42 USC 2457).

BACKGROUND OF THE INVENTION

1. Field of the Invention

This invention relates generally to optical sensors that employ fiber-optics, and more specifically to holographic processors that are utilized in such sensor systems.

2. Prior Art

Conventional sensor systems which include sensors adapted to measure various physical characteristics of a sample, typically provide an analog output signal. Consequently, should a digital representation of an output signal be desired, relatively expensive and space consuming analog-to-digital equipment is required. Moreover, such conventional analog sensors are limited in application because of their inherently large size and slow response time. Moreover, either complex transmission lines or signal conversion apparatus may be required when the sensor must collect information from a remote sample. Hence, prior art transmission systems that have heretofore been interfaced with sensors of the prior art are relatively expensive to fabricate, are not capable of carrying sufficiently wide bandwidth signals, lack immunity to electro-magnetic and/or electric static interferences and require numerous interfacing apparatus.

There are prior art devices that are known to those skilled in the art which are generally adapted to optically decode information that is transmitted by means of incident light beams in order to measure various physical parameters (such as temperature, pressure, etc.). It is generally well known that it is preferable to provide means for transmitting and utilizing signals representative of such physical parameters in a digital format to enhance the accuracy of the transmission and also to provide signals that are compatible with modern microprocessor controlled systems for utilizing the sensor signals. An example of an optical sensor system that utilizes a fiber optic transmission apparatus to provide accurate digital representations of a physical parameter from a remote sample can be found in U.S. Pat. No. 4,223,226 issued Sept. 16, 1980. However, nothing is known in the prior art which shows or suggests the use of holographic processors in such sensor systems. In particular, there is no known prior art which uses holographic processors for enhancing the utilization of optical signals in such a system by enabling multiplexing and demultiplexing of such optical signals, or for that matter, conversion of optical signals directly into any one of a number of digital formats as hereinafter disclosed and which even further reduce the cost and complexity of optical sensor systems.

SUMMARY OF THE INVENTION

Briefly, and in general terms, a method and apparatus for holographically processing optical signals is disclosed. Holographic processors are utilized, by way of example, in various combinations with light sources, fiber optic transmission means, sensors and detectors, to enhance optical signal processing in a fiber optic sensor system.

In more specific terms, the present invention utilizes unique optical function holograms in methods and apparatus for color multiplexing optical sensor signals, for converting an incoherent fiber optic bundle input into a coherent fiber optic bundle output, for converting a source signal directly into a binary coded signal, for converting an incoherent fiber optic bundle input directly into a coherent binary signal fiber optic bundle output, and for demultiplexing a previously multiplexed optical signal for application to a detector. In each such novel and highly advantageous holographic implementation of an optical processing system, a unique geometrical orientation of a hologram with respect to the direction of optical signal transmission is utilized to minimize or totally preclude the incidence of spurious signals that prior to and without the novel teachings of the applicants have precluded the otherwise advantageous use of holographic processors in optical sensor systems. In each application of holographic processing of the present invention, the advantageous results derived therefrom are made possible by a unique characteristic of holograms that would be extremely difficult if not impossible to duplicate in an ordinary optical lens. That characteristic in a hologram is its ability to respond to certain physical characteristics of incident optical signals, such as their wavelength or physical position, by directing such optical signals at the output of the hologram to highly predictable focal point locations. It will be seen hereinafter that this unique characteristic of holograms, although suitable for numerous applications in optical systems, is especially advantageous for use in conjunction with fiber optic bundles and photo-detectors utilized in fiber optic sensor processing systems.

The above noted advantages of the novel holographic processors of the present invention, are achieved without incurring the spurious signal interference that would otherwise occur in optical systems employing holograms.

The means by which the above noted advantages as well as others have been achieved, and the means by which the above noted spurious signal problem has been substantially overcome to permit the advantageous use of holograms, particularly in optical sensor systems, will be best understood by reference to the detailed description of the invention and the accompanying drawings in which:

DETAILED DESCRIPTION OF THE INVENTION

Before proceeding with reference to the drawings for a detailed description of the various embodiments of the invention contemplated herein, some general comments are in order. Because the holographic processor of the present invention transforms a source pattern into an image, it appears to have much in common with conventional optical information processing systems. In a general sense, the holographic processor of the present invention is an optical information processing system. However, the usual optical information processing involves the use of a lens to create a spatial Fourier transform. Then by way of example, filters are used to operate on that Fourier transform. Then a second lens is used to recreate the image by performing a reverse Fourier transform. However, the holographic processor as described herein, utilizes no lenses and involves no Fourier transform.

In a conventional hologram, reconstruction of an image occurs when a hologram is illuminated by a parallel or spherical beam of light; normally monochromatic. Such light reflects off a complex pattern contained in the holograms so that numerous light rays converge, in-phase, at each point in a real image. On the other hand, light rays may diverge in such a manner that the rays of light appear to have been in-phase at points on a virtual image. In a conventional pictorial hologram, the hologram reduces all of the points which comprise a reconstructed real image, or which infer a virtual image produced by diverging beams of light from the hologram. In any case, the particularly useful characteristic of a hologram which makes it particularly suitable for purposes of optical signal processing in fiber optic systems, is that a holographic pattern has the capability of imaging any one source point on to a particular point on the opposite side of the hologram. The component of the holographic pattern which achieves this imaging capability comprises a series of circular patterns, which collectively are known as a Fresnel Zone Plate. A Fresnel Zone Plate, which images one point of a source to one point of an image, consists of a set of quasi-circular rings centered about appropriate locations on the hologram. Each such pattern consists of the equivalent of a lens with its center at those appropriate locations.

Figure 1:
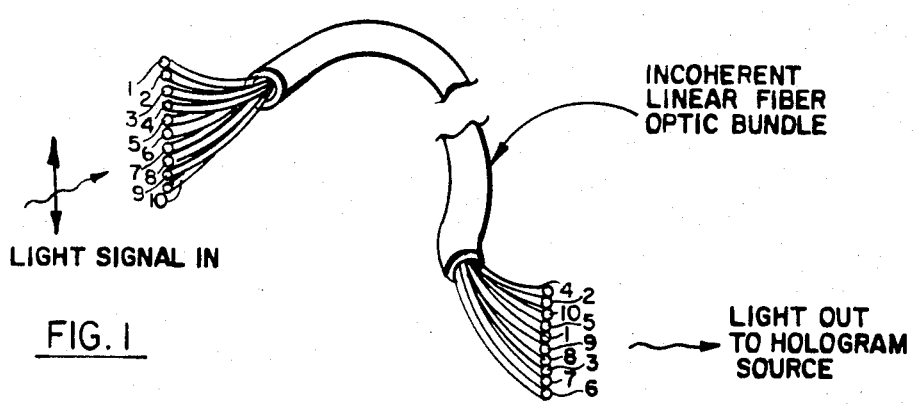
FIG. 1 is an illustrative example of an incoherent linear fiber optical bundle with which the present invention may be employed to generate a coherent signal therefrom.
Figure 2:
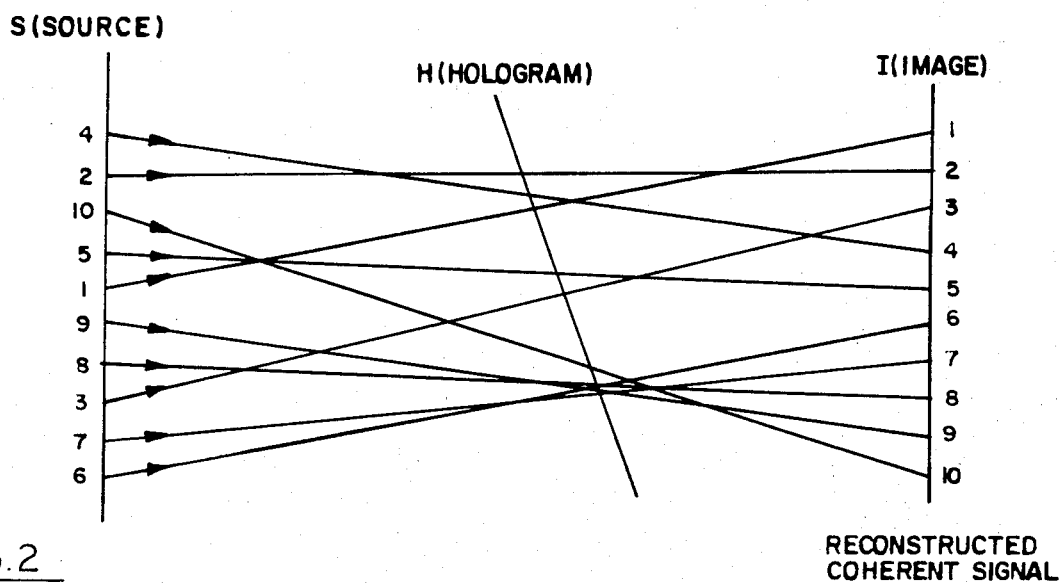
FIG. 2 is a graphical illustration of the manner in which a coherent signal may be reconstructed from an incoherent signal using the present invention.

In view of the above indicated capability of transferring a known source point to a known image point, one of the advantageous uses of a hologram in a fiber optic sensor processing system may be best understood by concurrent reference to FIGS. 1 and 2. FIG. 1 illustrates an incoherent fiber-optic bundle which has been brought out to a linear array at each end thereof. The bundle is incoherent because the location of the fibers at the output end of the fiber optic bundle is random with respect to the location of the fibers at the input end of the bundle. This is illustrated in FIG. 1 by the depiction of a small number of fibers, in this case ten fibers for illustration purposes, which are numbered from 1 to 10 in sequence as a function of location at the input end of the bundle. However, as illustrated in FIG. 1, the fibers emanating at the output end of the bundle, wherein each fiber retains the same number, are randomly located with respect to one another so that their input sequence is substantially altered.

The use of a hologram to reorient the signals available at the output of the fiber optic bundle, is illustrated in FIG. 2. At the left side of FIG. 2 is an array of source signals S, in which the fiber optic signals are in the sequence in which they are found to leave the incoherent linear bundle as previously illustrated in FIG. 1. The hologram is designed, so that, for example, point 4 at the top of source S produces an image only at point 4 in the image plane I which is in the fourth position or namely, that position that corresponds to the original light signal at the input side of the incoherent linear fiber optic bundle previously illustrated in FIG. 1. Similarly, each of the other points at the source, produces an image at the proper location in the sequence. Of course, it will be understood that the light rays drawn in FIG. 2 from source to image represent only the center line rays for purposes of simplification. A more representative set of rays is shown in FIG. 3.

Figure 3:
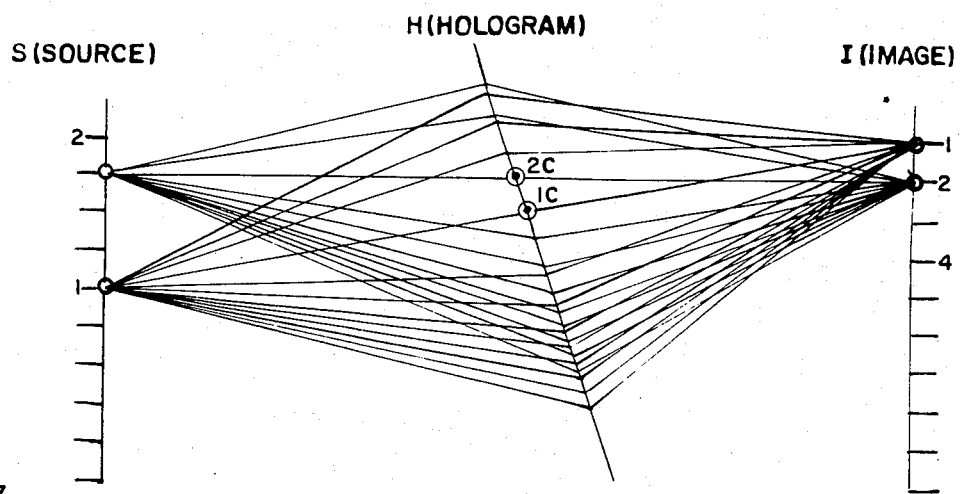
FIG. 3 is a further graphical illustration of the manner in which two specific components of an incoherent signal source are made coherent by means of the present invention.

In FIG. 3 the rays which, for example, pass from the point 2 in the source to the point 2 in the image are reflected by the pattern in the hologram so that these rays always have path links which differ only by integral wavelengths. Thus, the rays which number in the thousands are in-phase and support each other only at point 2 and generally do not support each other at any other point in the image plane. The hologram is designed so that this same selective in-phase reconstruction holds true for the multiple rays from the source point 1, which reflect off portions of the hologram to form a supportive image only at point 1 in the image plane.

The above indicated utilization of a hologram for the purpose of restoring a coherent signal from an incoherent linear fiber optic bundle is often a very useful application of the holographic processor of the present invention. However, the above indicated characteristic of a hologram has an additional important application in converting the output signals of an incoherent linear fiber optic bundle into a binary signal which, as will be hereinafter more fully understood, is a particularly useful application of holographic processors to sensor systems in which it is desirable to interface with a digital signal processor such as a microprocessor. In such an application, the input signal to the hologram from, perhaps, any of several hundred fibers, is a signal in which the particular fiber that is illuminated represents the amount of temperature change or pressure change or other sensed physical parameter. In a typical application, the ultimate output signal of the holographic processor is a binary signal that is either Gray-coded binary or conventional binary and which represents the number of the fiber that has been illuminated in response to the level of signals being measured. In effect, by converting an incoherent light output directly into a binary signal, two steps in sensor signal processing are accomplished. The first such step is that of converting incoherent signals to coherent signals and the second is that of converting the coherent signals into equivalent binary representations.

Figure 4:
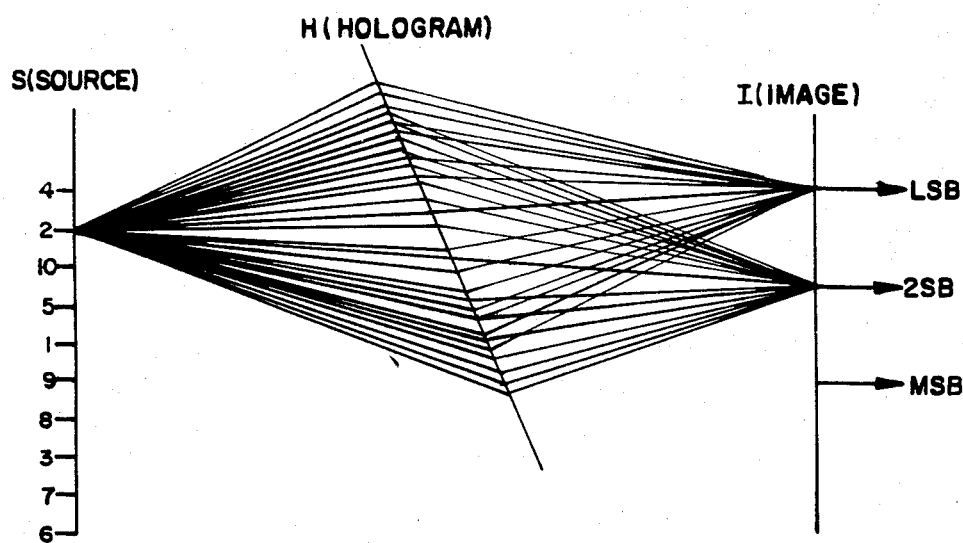
FIG. 4 is a graphical illustration of the manner in which the present invention may be utilized to convert a source point signal into a binary coded signal.
Figure 5:
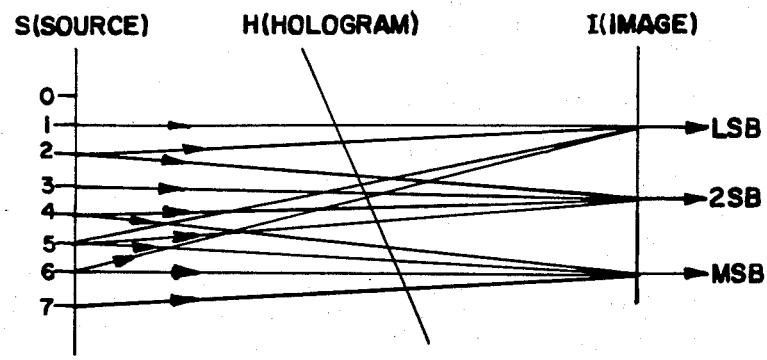
FIG. 5 is a graphical illustration of the manner in which the present invention may be utilized to convert a plurality of source point signals into a Gray-coded binary pattern.

FIGS. 4 and 5 illustrate that this double step is, with the appropriate holographic processor, as readily accomplished as the single step in which an incoherent signal is made coherent as previously described. In FIG. 4, the source point 2 is shown imaged by the hologram at the two points LSB and 2SB. Thus, the source point 2 produces the binary number 011. This number, 011, is a binary 2 in a Gray-code scheme. FIG. 5 illustrates the center line rays for a set of possible source signals labelled 0 through 7. The hologram is designed so that source signal 0 produces no image; source signal 1 produces images only at LSB, the least significant bit; source signal 2 produces images at both LSB and 2SB; and so on. As indicated below in Table I, the image pattern produced by the hologram of FIG. 5 corresponds to the Gray code for the corresponding source signal numbers.

TABLE I

| | SIGNIFICANT BITS | | |
| --- | --- | --- | --- |
| | MOST | 2ND | LEAST |
| 0 | 0 | 0 | 0 |
| 1 | 0 | 0 | 1 |
| 2 | 0 | 1 | 1 |
| 3 | 0 | 1 | 0 |
| 4 | 1 | 1 | 0 |
| 5 | 1 | 1 | 1 |
| 6 | 1 | 0 | 1 |
| 7 | 1 | 0 | 0 |

It will now be apparent that because the relationships between source and image patterns depend entirely upon the holographic imaging function, binary signals or Gray-coded binary signals, or binary signals of any other selected code, can be produced from either a random source pattern as illustrated in FIG. 4 or a sequential source pattern as illustrated in FIG. 5. In the case of a random source pattern which differs from unit to unit, it is, of course, necessary to individually fabricate the holograms for each source pattern. However, when the source is sequential as illustrated in FIG. 5, it is then possible to replicate the holograms after making the master hologram by illuminating corresponding spots on the source and image during the exposure of the hologram. In the case of a random source pattern, in which the patterns differ from unit to unit, an individual hologram is exposed for each individual pattern. In either case, the method of preparing the holographic pattern is well known in the art and need not be described in any detail herein. By way of example, reference may be had to the text entitled "Principles of Holography" second edition by Howard M. Smith, published by John Wiley and Sons, 1975.

The generation of various types of holograms which have been described herein follows the same general procedure. Components of the hologram are generated by sequentially illuminating the hologram from desired pairs of source and image points from a common coherent light source. For example, in FIG. 3 source point 1 and image point 1 may first be illuminated by using mirrors and beam splitters from a common laser beam. Next, source point 2 and image point 2 are simultaneously illuminated. The first exposure forms a component of the hologram which consists of a Fresnel Zone Plate centered about 1C. The second exposure, illuminating the hologram from source point 2 and image point 2, produces a zone plate centered about 2C. The remaining portions of the hologram are built up in the same manner, preferably using a mechanized system for indexing the exposures.

More than one component of the hologram can be exposed at one time. This is illustrated by the fact that a conventional (pictorial) hologram is built up by illuminating, simultaneously, all points in the object and exposing the hologram with the light reflected from this object and, at the same time, with the reference beam. For example, in FIG. 4 the source point 2 is intended to produce image points at both LSB and 2SB. Hence, if LSB and 2SB are illuminated simultaneously and coherently with source point 2, the exposure of the hologram will be an exact analog of the exposure of a conventional hologram where source point 2 replaces the reference beam and the LSB and 2SB image points replace two points of the image.

If the source contains 256 elements and the image contains 8 elements, where the 8 bits represent the number 256, the entire hologram may be made by exposing each bit simultaneously with all of the source points which contain that bit.

Figure 6:
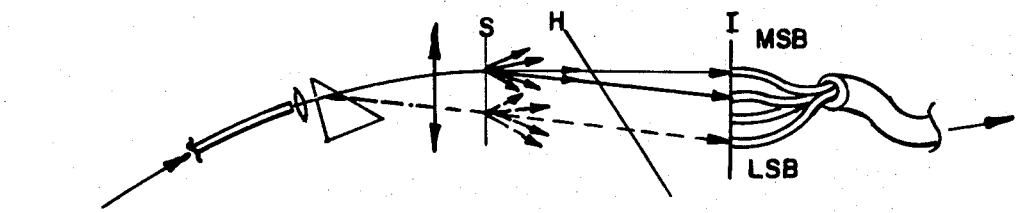
FIG. 6 and FIG. 7 are illustrative examples for utilizing the present invention in a sensor for converting a sensor signal directly into a binary signal.
Figure 7:
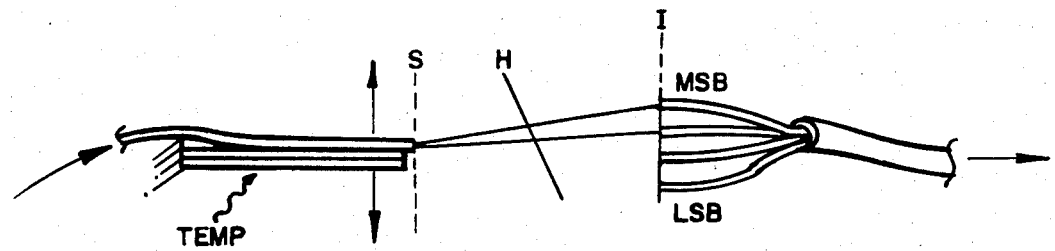
Figure 8A:
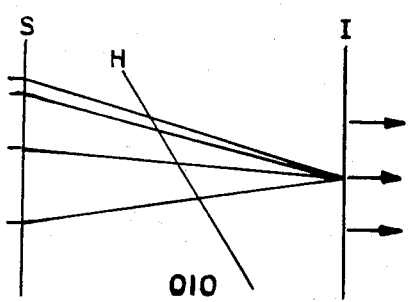
FIG. 8, comprising 8a through 8d, provides a graphical illustration of the ability of the present invention to convert a plurality of arbitrary signals to a single set of binary signals.
Figure 8B:
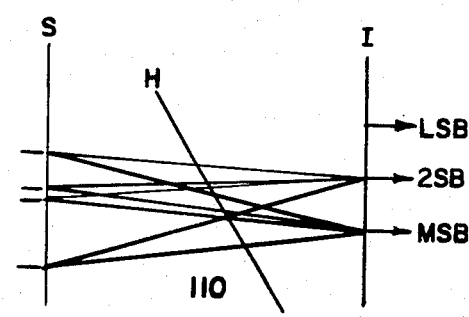
Figure 8C:
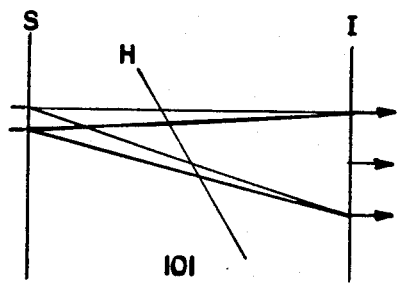
Figure 8D:
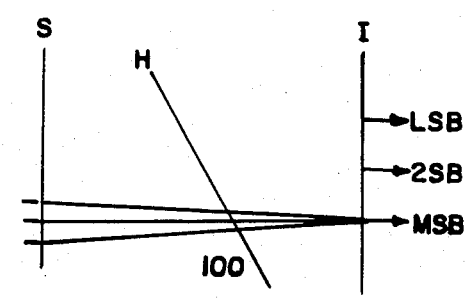

FIGS. 6 and 7 illustrate, respectively, two examples of applications of a holographic processor of the present invention for use as a portion of a remote sensor in a fiber optic system. In each case, a hologram enables a fiber optic sensor to accept a single light source from a fiber and transform this light source into a binary signal or Gray-coded binary signal and to return such a signal to a central processor by means of a fiber bundle having a plurality of fibers. The fiber bundle which is utilized to carry the return signal, need only have as many fibers as there are bits in the binary coded signal. For example, where a sensor signal level resolution of one part in two hundred and fifty six is desired, only eight fibers would be utilized. Each such fiber corresponds to one of eight bits. In FIG. 6 a light beam is shown being applied to a prism. Such a prism might consist of a high pressure gas that is sensitive to pressure or it might consist of a solid state refracting material, the index of refraction of which responds in a known way to temperature changes. In either case, the light beam is bent at an angle that corresponds to the level of the sensed physical parameter. The hologram H is designed to apply the source point only to those image points at the input to fibers in a small bundle. Each of the fibers is located at a position corresponding to a binary digit of either a Gray-coded binary scheme or a conventional binary scheme. It will be understood that the number of fibers and, therefore, the number of bits at the output side of the hologram, may be any number depending upon the level of resolution desired and the resolution of the hologram. In FIG. 7 the location of the source beam is dependent upon a change in temperature of a bimetallic strip upon which is fastened to the end of an illuminating fiber. The hologram H again converts the signal to a series of binary or Gray-coded binary signals for transmission to a remotely located receiver such as a central processing unit.

Although the applications illustrated in FIGS. 6 and 7 involve the conversion of a single light beam source, dependent upon a physical parameter, into a binary code, the present invention need not be limited to applications in which only a single light beam is converted. FIG. 8, comprising FIGS. 8a through 8d, illustrates the manner in which a plurality of signals at a source plane may, by means of the holographic processor of the present invention, be converted to binary or Gray-coded binary signals at the image plane. The significance of the additional capability of the present invention to convert a plurality of source signals into a single corresponding code is appreciated when the optical signal processing system utilizes a sensor which produces complex signal structures in response to a physical parameter. The holographic processor of the present invention permits such complex signal structures to be converted directly into a desirable binary-coded output. Although the particular source patterns illustrated in FIG. 8 are arbitrary and have no particular significance relative to any specific sensing system, FIG. 8 does represent the unlimited variations of sensor signal position and number to which a suitably prepared hologram may be applied by means of the present invention. The binary numbers produced by each hologram H of FIG. 8 are shown below the respective holograms.

Figure 9:
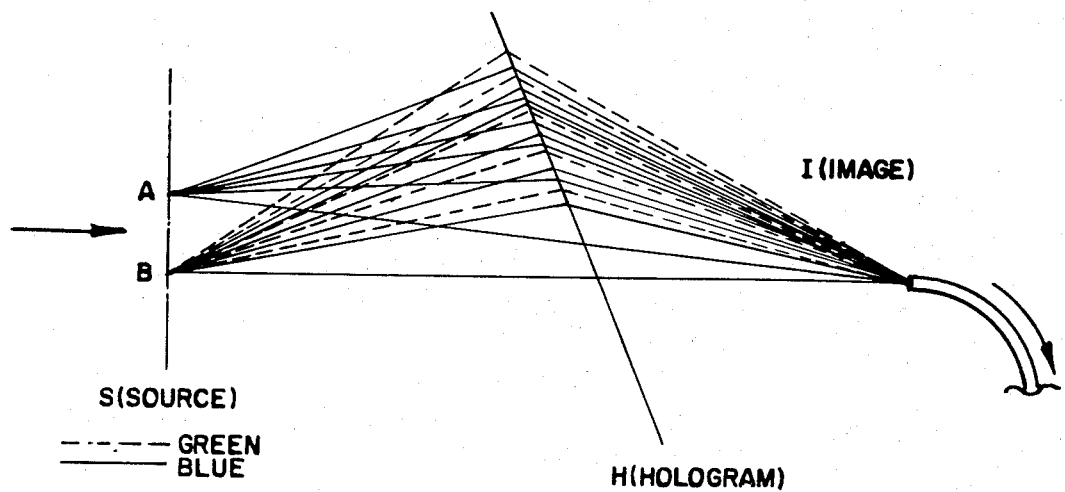
FIG. 9 is a graphical illustration of the manner in which the present invention may be utilized for color multiplexing in an optical sensor system.

Still other advantageous applications of the holographic processor of the present invention include color multiplexing and demultiplexing in optical sensor systems. The term "color multiplexing" as used herein refers to the use of different colored light, each color acting independently as a separate optical frequency functioning much like a carrier frequency in electrical transmission, but wherein each such carrier frequency or color represents one bit of information of a binary word. As illustrated in FIG. 9, color multiplexing may be readily accomplished by means of a holographic processor.

In FIG. 9 it is assumed that to the left of the source plane, (not shown), a white light source moves in the source plane in accordance with some input parameter such as temperature, pressure and the like, so that the color produced thereby is dependent upon variations in such a parameter. A and B in the source plane represent two out of many possible points in the source plane at which the resultant light may reside. The hologram in this application is designed to always produce an image at the same point in the image plane, namely, the point at which the signal transmitting fiber receives its light energy input. However, the hologram is designed so that it transmits various colors to the same image point depending upon the location of the source illumination. As will be apparent to those skilled in the art, the hologram illustrated in FIG. 9 may be fabricated by simultaneously irradiating opposite sides of a suitable photosensitive medium from a particular point (e.g. A) in the source plane and from the image point with beams of light both having a fixed phase relationship and containing the same wavelength or wavelengths with respect to one another (e.g. corresponding to the color blue), whereby to form a first Fresnel-like zone. Opposite sides of the photosensitive medium are next simultaneously irradiated from a different point (e.g. B) in the source plane and from the image point with beams of light having both a fixed phase relationship and containing the same wavelength or wavelengths with respect to one another (e.g. corresponding to the colors blue and green), but having a different wavelength from the light that originates at point A, thereby to form a second Fresnel-like zone. Accordingly, opposite sides of the photosensitive medium are simultaneously irradiated from various points in the source plane and from the image point with beams of light having a fixed phase relationship and containing the same wavelength or wavelengths with respect to one another, each of which wavelengths corresponding to a color that is associated with a particular location in the source plane. For example, if the source illumination is at A, then in this example, only blue light is reinforced at the image point I. On the other hand, if the light illuminates a source plane at point B, then the hologram will reinforce waves at the image point I for both blue and green light. In this fashion, the hologram is designed to convert white light signals along the source plane to color multiplexed signals in the output fiber as a function of the location of the white light source which is in turn dependent upon variations in the sensed parameter. Thus, the hologram is used to color encode, or multiplex an input signal and to transfer it to an image point at a transmission fiber which carries the color encoded information signal to a remotely located receiver, such as a central processor, over a single fiber.

Figure 10:
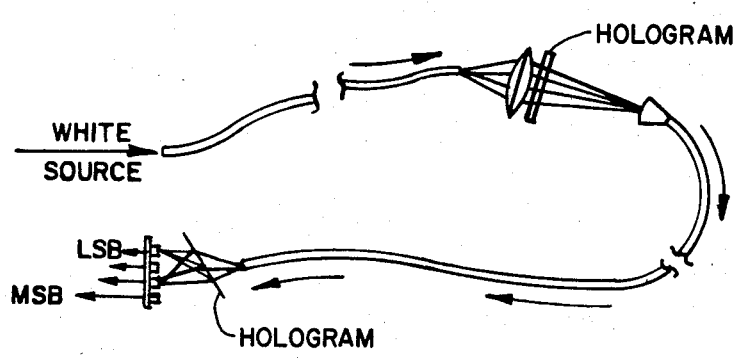
FIG. 10 is an illustrative example of the manner in which the present invention may be utilized for demultiplexing a previously color-multiplexed optical signal.

As illustrated in FIG. 10, a system such as illustrated in FIG. 9, may also use a holographic processor at the output end of the transmission fiber that carries the color encoded information to the central processing unit. The transmission system of FIG. 10 is described in greater detail in U.S. Pat. No. 4,223,216 issued Sept 16, 1980. In this case, the color multiplexed signal is decoded onto individual photosensors by a hologram in which the focus of the hologram is strongly dependent upon the wavelength of the light used. For example, if, as illustrated in FIG. 10, the hologram is designed to cause blue light to focus to the least significant bit LSB, then the portion of the hologram which causes this focusing will not cause focusing of light of a longer wavelength. Other components of the hologram will cause other colors to focus at other photosensor locations thus creating the desired decoded binary signal from the set of photosensors at the detector end of a transmission system. A thick-film (Lippman-Bragg) hologram will aid in this separation of colors because of the variation of its pattern separation throughout the thickness of the hologram depending upon the wavelength of the light.

At this point in the description of the invention herein, it will be noted that the representations of holograms in FIGS. 2 through 10 have indicated the holographic plane to be at an angle which is not perpendicular to the axis central of the incident light beams. This non-perpendicular angle or tipping, has been devised by the applicants herein as a means for overcoming signal interference or cross-talk which would otherwise be a serious problem in the use of holograms for the purpose herein described. For example, referring back to FIG. 3 wherein the Fresnel Zone Plate which images source point 1 to image point 1 consists of a set of quasi-circular rings centered about point 1C, the question arises, to what extent does the component of the hologram which consists of the Fresnel Zone Plate 1C cause the point 2 in the source to produce an image at the point 4? If this tendency is substantial, the operation of the holographic image processor may be defeated, because in addition to producing desired images, a plethora of spurious undesired images would also occur. However, the applicants have discovered that by tipping the hologram to the above, indicated non-perpendicular geometrical configuration, it is possible to defocus spurious images even for points close to the point for which the zone plate is designed to function. This potential problem and the means for solving it will now be discussed in conjunction with FIGS. 11 through 14 and Tables II through V.

Figure 11:
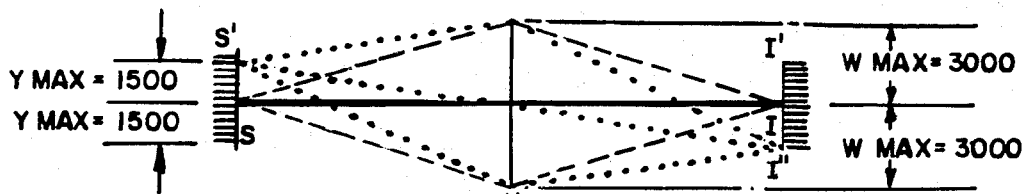
FIGS. 11 through 14 are graphical illustrations used to explain the novel manner in which the present invention substantially decreases spurious signal interferences.
Figure 12:
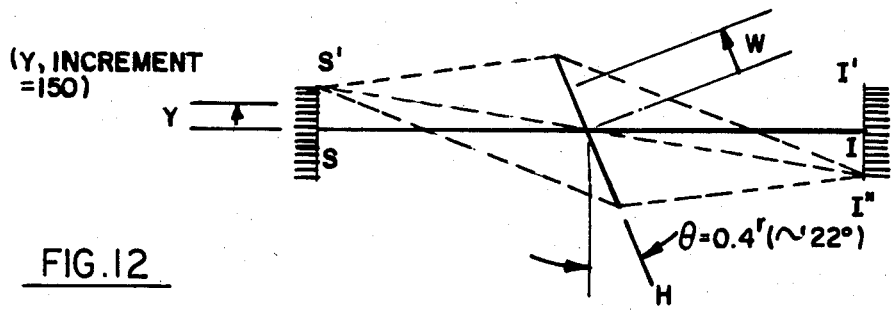
Figure 13:
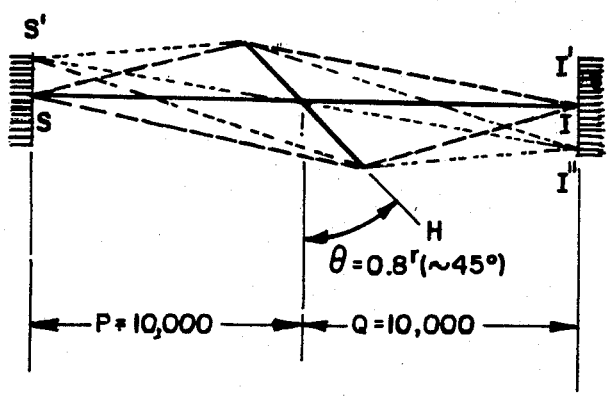

In FIGS. 11, 12, and 13 a source S is designed to produce an image I. In FIGS. 11, 12 and 13, the source S' is designed to produce the image I', but the lines between S' and I' have been omitted for clarity. However, dotted lines have been drawn between S' and I" where I" represents a spurious image that is produced by the component of the hologram which exists for the purpose of producing image I from source S. This SI Fresnel Zone Plate acts as a lens and possesses the potential capability of producing the spurious image I" from S'. In what follows, the degree to which that spurious image is produced is analyzed.

Figure 14:
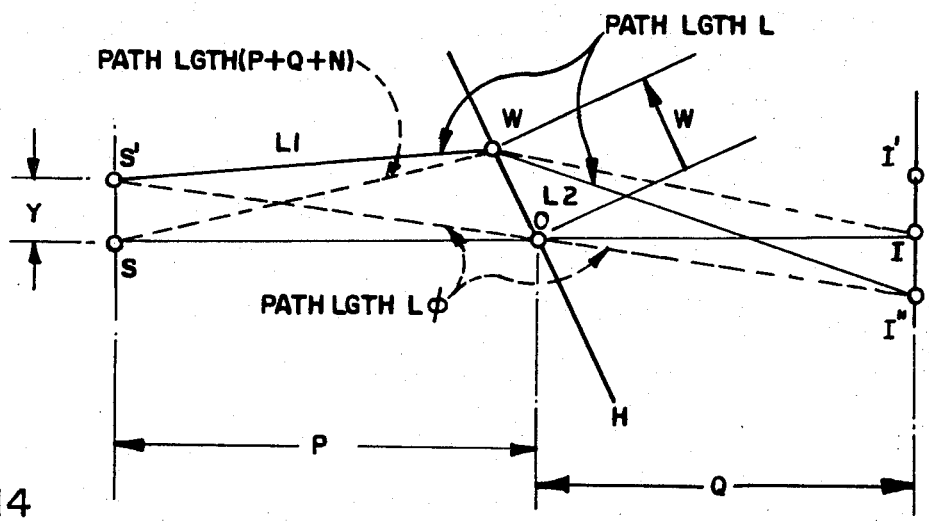

FIG. 14 shows some of the quantities used in this analysis. Y is a measure of distance (in number of wavelengths) along the source plane. W is a measure of distance (in number of wavelengths) along the plane of the hologram H. The hologram H has optically supportive portions at those locations I at which the total path link from S to W to I exceeds the central path link P plus Q by an integral number of wavelengths N. The path link length from S' to W to I equals $L_1+L_2$ which, in turn, equals L. The difference between the path length L and separation distance between the image and source planes is denoted C. When considering the center point of the zone plate for the path from S' to I", (or the zero fringe of the Fresnel Zone Plate) $L=L_o$ and $C=C_o$. These relationships of the various dimensions represented in FIG. 14 and discussed above, are presented below in equation format.

$L=L_1+L_2$
$C=L-(P+Q)$
$L_o=L$ for $N=0$ and $W=0$ (at $Y=0$, the hologram is designated so that $C-C_o=L-L_o=N$ for all N)
$C_o=C$ for $N=0$ and $W=0$
$C_o=L_o-(P+Q)$
$L-L_o=C+(P+Q)-[C_o+(P+Q)]$
$L-L_o=C-C_o$ If a spurious image at I" is to be formed, then all of the path links L for the various values of W for which the hologram has optically dispersive portions, must differ by integral numbers or nearly integral numbers.

The analysis of the spurious image problem was not found to be amenable to a closed mathematical form and was therefore conducted by means of a computer analysis in the following manner. For each value of N for which a calculation was to be made, the value of W at which the total path length L equals $P+Q+N$ was found by iteration. This value of W as then used to find the length of the path from S' to W to I". The amount by which the path length S' to W to I" differs from the central path length $L_o$ was then calculated as $L-L_o$. Finally, the amount by which $L-L_o$ value differed from the value N was calculated as the amount by which the light ray through that portion of the hologram deviated from being in-phase with the central light ray. This difference is equal to $N-(C-C_o)$ as indicated above.

The listing of the program used to accomplish this calculation is included herein in Table V. Samples of computer runs are included in Tables II, III and IV. In each of Tables II, III and IV the values of $N-(C-C_o)$ are listed for increasing fringe numbers N and corresponding W values (to a maximum W of about 3,000 wavelengths) where $Y=0$ provides a computer program check and where $Y=150$ at S'. FIGS. 11, 12 and 13 are respective scale drawing representations of the parameters used in these computer runs.

TABLE II

| N | N—(C—Co) | W |
|---|---|---|
| ******THETA = | 0 | ******** |
| VALUE OF Y: = | 0 | |
| VALUE OF Co = | 0 | |
| 0 | 0 | .313639 |
| 100 | 0 | 1001.25 |
| 200 | 0 | 1417.74 |
| 300 | 0 | 1738.53 |
| 400 | 0 | 2009.98 |
| 500 | 0 | 2250.00 |
| 600 | 0 | 2467.79 |
| 700 | 0 | 2668.80 |
| 800 | 0 | 2856.57 |
| 900 | 0 | 3033.56 |
| VALUE OF Y: = | 150 | |
| VALUE OF Co = | 2.24988 | |
| 0 | 0 | .313639 |
| 100 | .0334 | 1001.25 |
| 200 | .0661 | 1417.74 |
| 300 | .0982 | 1738.53 |
| 400 | .1297 | 2009.98 |
| 500 | .1606 | 2250.00 |
| 600 | .1908 | 2467.79 |
| 700 | .2205 | 2668.80 |
| 800 | .2497 | 2856.57 |
| 900 | .2782 | 3033.56 |

TABLE III

| N | N—(C—Co) | W |
|---|---|---|
| ******THETA = | .4 | ******** |
| VALUE OF Y: = | 0 | |
| VALUE OF Co = | 0 | |
| 0 | 0 | .314118 |
| 100 | 0 | 1086.10 |
| 200 | 0 | 1536.55 |
| 300 | 0 | 1882.60 |
| 400 | 0 | 2174.70 |
| 500 | 0 | 2432.38 |
| 600 | 0 | 2665.65 |
| 700 | 0 | 2880.46 |
| 800 | 0 | 3080.69 |
| VALUE OF Y: = | 150 | |
| VALUE OF Co = | 2.24988 | |
| 0 | 0 | .314118 |
| 100 | 1.2819 | 1086.10 |
| 200 | 2.5327 | 1536.55 |
| 300 | 3.7531 | 1882.60 |
| 400 | 4.9437 | 2174.70 |
| 500 | 6.1053 | 2432.38 |
| 600 | 7.2385 | 2665.65 |
| 700 | 8.3438 | 2880.46 |
| 800 | 9.4220 | 3080.69 |

TABLE IV

| N | N—(C—Co) | W |
|---|---|---|
| ******THETA = | .8 | ******** |
| VALUE OF Y: = | 0 | |
| VALUE OF Co = | 0 | |
| 0 | 0 | .314573 |
| 100 | 0 | 1429.62 |
| 200 | 0 | 2014.00 |
| 300 | 0 | 2457.44 |
| 400 | 0 | 2827.36 |
| 500 | 0 | 3150.02 |
| VALUE OF Y: = | 150 | |
| VALUE OF Co = | 2.24988 | |
| 0 | 0 | .314573 |
| 100 | 3.0605 | 1429.62 |
| 200 | 6.0467 | 2014.00 |
| 300 | 8.9586 | 2457.44 |
| 400 | 11.7967 | 2827.36 |
| 500 | 14.5611 | 3150.02 |

TABLE V

```
100  PRINT"3, 4 (ADD C—Co), OR 5 ADD D2) OUTPUT COLUMNS?"
110  INPUT K
120  PRINT "VALUES OF P,Q"
130  INPUT P,Q
140  PRINT "T MIN, T MAX, T INCR"
150  INPUT T1, T2, T3
160  PRINT "MAXIMUM VALUE OF W"
170  INPUT W2
180  PRINT "Y MIN, Y MAX, Y INCR"
190  INPUT Y1, Y2, Y3
200  PRINT "VALUES OF N1, N FINAL, N INCR"
210  INPUT N1, N2, N3
220  LET L=P+Q
230  PRINT
231  PRINT
240  IF K=3 THEN 300
250  IF K=4 THEN 280
260  PRINT "N", "N—(C—Co)", "W", "C—Co", "D2"
261  PRINT "—", "————————", "—", "————", "———"
270  GO TO 310
280  PRINT "N", "N—(C—Co)", "W", "C—Co"
281  PRINT "———", "————————", "————", "—————"
290  GO TO 310
300  PRINT "N", "N—(C—Co)", "W"
301  PRINT "————", "————————", "————"
310  FOR T=T1 TO T2 STEP T3
320  PRINT
321  PRINT
330  PRINT "******THETA = ", T, "********"
340  FOR Y=Y1 TO Y2 STEP Y3
350  PRINT
360  PRINT "VALUE OF Y:", Y
370  LET N=0
380  GOSUB 450
390  Co=C
400  PRINT "VALUE OF Co", Co
410  PRINT
420  FOR N=N1 TO N2 STEP N3
430  GOSUB 450
440  GO TO 620
450  LET W=10
483  LET D2=−L+SQR(W*W+P*P−2*P*W*SIN(T))+SQR(W*W+Q*Q+2*P*W*SIN(T))−N
490  IF D2*D2<1.0E−10 THEN 540
500  LET R1=(2*W−2*P*SIN(T))/(2*SQR(W*W+P*P−2*P*W*SIN(T)))
510  LET R2=(2*W+2*Q*SIN(T))/(2*SQR(W*W+Q*Q+2*Q*W*SIN(T)))
520  LET W=W−D2/(R1+R2)
530  GO TO 480
540  L5=P−W*SIN(T)
550  L6=W*COS(T)−Y
560  L1=SQR(L5*L5+L6*L6)
570  L7=Q+W*SIN(T)
580  L8=W*COS(T)+Y*Q/P
590  L2=SQR(L7*L7+L8*L8)
600  LET C=L1+L2−P−Q
610  RETURN
620  C5=N—(C—Co)
630  C5=INT(10000*C5)/10000
650  IF K=3 THEN 710
660  IF K=4 THEN 690
670  PRINT N,C5,W,C—Co,D2
680  GO TO 720
690  PRINT N,C5,W,C—Co
700  GO TO 720
710  PRINT N,C5,W
713  IF W<W2 THEN 720
714  N=N2+10
720  NEXT N
730  NEXT Y
740  NEXT T
750  END
```

The scale for FIGS. 11, 12 and 13 is indicated by the following:

FOR λ=0.7μM,  Pλ=Qλ = 7MM
              Yλ MAX = 1.05 MM     Yλ INCR=0.105MM
              WλMAX = 2.1 MM

SCALE AT λ=  0.7μM: ¼INCH =  1MM (6.35 X)

For a wavelength of 7000 Å, FIGS. 11, 12 and 13 correspond to a scale of one-quarter inch equals 1 millimeter. The increments of Y are about one-tenth millimeter, or 100 microns, which is a typical spacing for adjacent fibers in a fiber-optic bundle.

As indicated in Table II, the first computer run was for theta equal to zero, Y=0 and Y=150, and the calculations were made at every one-hundredth fringe, that is for N=0, 100,200,300, ..., 900. As indicated, with theta equal to zero and Y equal to zero, the quantity N−(C−Co) is everywhere zero. This portion of the computer run serves as a check on the program because if these terms were not everywhere zero, the program would be in error. For a value of Y equal to 150 wavelengths, (about 100 micrometers), it is seen that N−(C−Co) varies from 0 to 0.278. This indicates that as far out as the nine-hundredth fringe, which is a distance of W equal to 3033 wavelengths, the phase difference is only one-quarter of a wavelength. Thus, it would be expected that a fairly large spurious signal would occur at this location.

The results of tipping the hologram a value of theta equal 0.4 radians, (about 22 degrees), show that the value for N−(C−Co) is again everywhere 0 when Y equals 0. This again serves as a program check because the hologram is designed for this point. However, the point of major interest is that for values of the quantity Y equal to 150 wavelengths, N varies from 0 to 800, W varies from 0 to 3080, and the value of N−(C−Co) varies from 0 to 9.42. This variation represents considerable phase shift. In fact, this amount of phase shift would very nearly eliminate this spurious signal and thus represents a very rapid defocusing of the Fresnel Zone Plate because the source has moved only the small distance of 150 wavelengths or about 100 micrometers. The effect of tipping the hologram is thus made clear when the quantity 9.42 in Table III is compared to the quantity 0.278 in Table II.

Table IV listings indicate even more rapid defocusing when the hologram, H, is tipped to theta equal to 0.8 radians (about 45 degrees).

It will now be understood that what has been disclosed herein is a method and apparatus for holographically processing optical signals in sensor systems that are used to monitor physical parameters. Such processing includes color multiplexing, demultiplexing, converting incoherent signals in a fiber-optic cable to coherent signals, converting incoherent signals to binary coherent signals. In general terms, what has been disclosed are methods and apparatus for processing optical signals at both the sensor portion and detector portion of a fiber-optic sensor system, and which incorporate holograms in a unique application to such sensor systems. In addition, a unique geometrical configuration for such holograms with respect to the incident optical signals, has been disclosed as a means for minimizing and substantially avoiding the inimical interference that might otherwise be produced by the inadvertent focusing of spurious signals at certain locations on the image plane of the hologram.

It will now be apparent that while preferred embodiments of the invention have been disclosed herein, the teaching of the applicants lends itself to modifications and various additional applications of holographic processors that may be made without departing from the true spirit and scope of the invention. By way of example, although the described method and apparatus for holographically processing optical signals in a fiber-optic system are particularly suitable for sensing physical parameters where an accurate digital representation of a physical measurement is desired, they also have application to other optical signal processing systems such as optical communication systems.

Having thus set forth preferred embodiments of the present invention, what is claimed is:

1. A method of reporting the status of a physical parameter to a receiving station, the method comprising the steps of:
    sensing said physical parameter;
    supplying a first beam of light and varying the spectral wavelength distribution of said light beam as a function of the status of said parameter being sensed;
    applying said spectrally-varied beam of light to a hologram for focusing responsive beams of light on an image plane at predetermined points, the locations of said points being responsive to an encoded signal that is dependent upon the spectral distribution of said beam of light; and
    transferring said encoded signal to said receiving station by inputing said responsive beams of light to a light transmission means having one end at said image plane and having another end at said receiving station.

2. The method of reporting the status of a physical parameter as defined in claim 1, wherein the light transmission means is a bundle of fiber-optic cables.

3. The method of reporting the status of a physical parameter as defined in claim 1, wherein said receiving station is located remotely with respect to said hologram.

4. The method of reporting the status of a physical parameter as recited in claim 1, further comprising the step of:
    decoding said encoded signal by selectively applying said signal to one of a plurality of photo-detectors, said one being selected in accordance with the wavelength of said signal.

5. The method of reporting the status of a physical parameter as defined in claim 4, wherein in said decoding step said photodetector selection comprises the following step:
    applying said encoded signal to an additional hologram positioned between said light transmission means and said receiving station, said additional hologram having Fresnel Zone Plates for focusing responsive beams of light on an image plane at predetermined locations which are dependent upon the respective wavelengths of the encoded signal being applied to said additional hologram and wherein one of said photodetectors is positioned at each of said predetermined locations.

6. The method of reporting the status of a physical parameter as defined in claim 1, wherein said encoded signal is in a binary format.

7. The method of reporting the status of a physical parameter as defined in claim 1, wherein said encoded signal is in a Gray-code binary format.

8. The method of reporting the status of a physical parameter as defined in claim 1, comprising the additional step of:
    orienting said hologram at an angle of at least 20 degrees with respect to a plane that is aligned perpendicular to the direction of said first beam of light.

9. An apparatus for reporting the status of a physical parameter to a receiving station, the apparatus comprising:
    means for sensing said physical parameter;

means for applying a first beam of light and for varying the spectral wavelength distribution of said light as a function of the status of said parameter being sensed;

means for applying said spectrally-varied beam of light to a hologram for focusing responsive beams of light on an image plane at predetermined points, the locations of said points being responsive to an encoded signal that is dependent upon the spectral distribution of said beam of light; and means of transferring said encoded signal to said receiving station by inputting said responsive beam of light to a light transmission means having one end at said image plane and having another end at said receiving station.

10. The apparatus for reporting the status of a physical parameter as defined in claim 9, wherein said light transmission means is a bundle of fiber-optic cables.

11. The apparatus for reporting the status of a physical parameter as defined in claim 9, wherein said receiving station is located remotely with respect to said hologram.

12. The apparatus for reporting the status of a physical parameter as defined in claim 9, further comprising:
means for decoding said encoded signal by selectively applying said signal to one of a plurality of photo-detectors, said one being selected in accordance with the wavelength of said signal.

13. The apparatus for reporting the status of a physical parameter as defined in claim 12, having means for photodetector selection, said selection means comprising:
an additional hologram positioned between said light transmitting means and said receiving station, and
means for applying said encoded signal to said additional hologram for focusing responsive beams of light on an image plane at predetermined locations which are dependent upon the respective wavelengths of the encoded signal being applied to said additional hologram and having one of said photodetectors positioned at each of said predetermined locations.

14. The apparatus for reporting the status of a physical parameter as defined in claim 9, wherein said encoded signal is in a binary format.

15. The apparatus for reporting the status of a physical parameter as defined in claim 9, wherein said encoded signal is in a Gray-code binary format.

16. The apparatus for reporting the status of a physical parameter as defined in claim 9, further comprising:
means for orienting said hologram at an angle of at least 20 degrees with respect to a plane that is aligned perpendicular to the direction of said first beam of light.

17. An optical sensor system for sensing the status of a physical parameter, said sensor system comprising:
source means for providing a supply of incident light signals,
means to receive and spectrally disperse the incident light signals according to the status of the physical parameter,
hologram means,
light transmitting means for transmitting said spectrally dispersed light signals to said hologram means, said hologram means focusing responsive beams of light at predetermined locations in an image plane, which locations are dependent upon the wavelengths of the spectrally dispersed light signals, and photodetector means positioned at said predetermined locations in said image plane for receiving respective ones of said light beams that are focused thereat by said hologram means, said photodetector means providing an output signal that is indicative of the status of the parameter being sensed.

18. The optical sensor system as defined in claim 17, wherein said light transmitting means includes at least one optical fiber positioned between said incident light dispersing means and said hologram means, and
means to focus said spectrally dispersed light signals onto said light transmitting means, so that a color encoded optical signal representative of said spectrally dispersed light signals is carried on said light transmitting means to said hologram means,
said hologram means decoding said color encoded optical signal by focusing the responsive beams of light at the particular locations of said photodetector means, which locations are dependent upon the respective wavelengths of the spectrally dispersed light signals.

19. The optical sensor system as defined in claim 18, wherein said means to focus said spectrally dispersed light signals onto said light transmitting means is an additional hologram means.

20. A method of indicating the status of a physical parameter, said method comprising the steps of:
providing a supply of incident light signals;
sensing said physical parameter and spectrally dispersing said incident light signals according to the status of the physical parameter;
transmitting said spectrally dispersed light signals to a hologram for focusing responsive beams of light at predetermined locations in an image plane, which locations are dependent upon the wavelengths of the spectrally dispersed light signals; and
positioning photodetector means at said predetermined locations in said image plane for receiving respective ones of said light beams that are focused thereat by said hologram, said photodetector means providing an output signal that is indicative of the status of the parameter being sensed.

21. The method of indicating the status of a physical parameter as defined in claim 20, including the additional steps of:
focusing said spectrally dispersed light signals onto said light transmitting means and transmitting a color encoded optical signal that is indicative of the status of said parameter over said light transmitting means to said hologram, and
decoding said color encoded optical signal at said hologram by focusing responsive beams of light at the particular locations of said photodetectors means, which locations are dependent upon the respective wavelengths of said spectrally dispersed light signals.

22. The method of indicating the status of a physical parameter as defined in claim 21, including the additional step of:
transmitting said spectrally dispersed light signals to an additional hologram, said additional hologram focusing said spectrally dispersed signals onto said light transmitting means.

* * * * *